(12) United States Patent
Wallack et al.

(10) Patent No.: US 8,126,253 B2
(45) Date of Patent: Feb. 28, 2012

(54) AUTOMATICALLY DETERMINING MACHINE VISION TOOL PARAMETERS

(75) Inventors: Aaron Wallack, Nashua, MA (US); David Michael, Wayland, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 1046 days.

(21) Appl. No.: 11/392,115

(22) Filed: Mar. 29, 2006

(65) Prior Publication Data

US 2011/0317906 A1  Dec. 29, 2011

Related U.S. Application Data

(60) Provisional application No. 60/736,361, filed on Nov. 12, 2005.

(51) Int. Cl.
*G06K 9/00* (2006.01)
(52) U.S. Cl. .......................... 382/141; 382/145
(58) Field of Classification Search .......... 382/141–152; 702/34, 35; 348/86–95, 126–134
See application file for complete search history.

(56) References Cited

U.S. PATENT DOCUMENTS 6,240,208 B1   5/2001   Garakani et al.

(Continued)

FOREIGN PATENT DOCUMENTS

JP   9305743 A   11/1997

(Continued)

OTHER PUBLICATIONS

Lipschutz et al. "Schaum's Outline of Theory and Problems of Discrete Mathematics. Second Edition." McGraw-Hill, 1997, pp. 102-104.*

(Continued)

*Primary Examiner* — Jon Chang
(74) *Attorney, Agent, or Firm* — David J. Powsner

(57) ABSTRACT

A method for automatically determining machine vision tool parameters is presented, including: marking to indicate a desired image result for each image of a plurality of images; selecting a combination of machine vision tool parameters, and running the machine vision tool on the plurality of images using the combination of parameters to provide a computed image result for each image of the plurality of images, each computed image result including a plurality of computed measures; comparing each desired image result with a corresponding computed image result to provide a comparison result vector associated with the combination of machine vision tool parameters, then comparing the comparison result vector associated with the combination of machine vision tool parameters to a previously computed comparison result vector associated with a previous combination of machine vision tool parameters using a result comparison heuristic to determine which combination of machine vision tool parameters is best overall.

69 Claims, 7 Drawing Sheets

U.S. PATENT DOCUMENTS

| | | |
|---|---|---|
| 6,323,776 B1 * | 11/2001 | Jackson et al. ............... 340/679 |
| 6,327,393 B1 | 12/2001 | Bruder |
| 6,424,734 B1 | 7/2002 | Roberts et al. |
| 6,490,375 B1 | 12/2002 | Garakani et al. |
| 6,577,758 B1 | 6/2003 | Kawata et al. |
| 6,829,371 B1 | 12/2004 | Nichani et al. |
| 7,545,949 B2 | 6/2009 | Mirtich et al. |
| 7,636,449 B2 | 12/2009 | Mirtich et al. |
| 7,751,625 B2 | 7/2010 | Ulrich et al. |
| 2002/0057838 A1 | 5/2002 | Steger |
| 2004/0131256 A1 * | 7/2004 | Fujieda et al. ............... 382/199 |
| 2004/0208350 A1 | 10/2004 | Rea et al. |
| 2005/0031191 A1 | 2/2005 | Venkatachalam |
| 2005/0213807 A1 | 9/2005 | Wasserman |
| 2009/0273668 A1 | 11/2009 | Mirtich et al. |

FOREIGN PATENT DOCUMENTS

| | | |
|---|---|---|
| JP | 2005258609 A | 9/2005 |
| JP | 2006011270 A | 1/2006 |
| JP | 2006258516 A | 9/2006 |

OTHER PUBLICATIONS

International Search Report, PCT/US07/07759, dated Feb. 7, 2008.

Cognex Corporation, OCVMax Application Guide, Verifying Character Strings on a Curved Surface, pp. 10-11, Nov. 2005.

Cognex Corporation, VisionPro User's Guide, OCVMax Tool, Training and Tuning, 10 pages, 2005.

Cognex Corporation, VisionPro Control Reference, OCVMax Tool Edit Control, p. 2, Publication Date 2005.

Cognex Corporation, Acumen, a division of Cognex Corp., WinOCR, Wafer Identification User's Guide, Chapter 4, pp. 27-32, WinOCR Interface, 1995.

Cognex Corporation, AcuReader, Automated Identification Guide, Version 1.0, Concepts and Applications, Chapter 4, Optical Character Recognition, 1996.

Japanese Patent Application 2009-502992 Official Notice of Rejection, Jan. 7, 2011.

* cited by examiner

AUTOMATICALLY DETERMINING MACHINE VISION TOOL PARAMETERS

CROSS REFERENCE TO RELATED APPLICATIONS

This application is entitled to the benefit of Provisional Patent Application entitled "Automatically Determining Machine Vision Tool Parameters", filed Nov. 12, 2005, as Application Ser. No. 60/736,361 herein incorporated by reference.

FIELD OF THE INVENTION

This invention relates to machine vision, and particularly to determining operational parameters of machine vision tools.

BACKGROUND OF THE INVENTION

In many machine vision applications, such as probe mark inspection (PMI), it is necessary to adjust the parameters of a machine vision tool to ensure satisfactory performance and results. However, manually adjusting the parameters, such as registration and inspection parameters, often requires the expertise of an experienced vision engineer, and even in that case, finding a good set of parameters can be a very time-consuming process.

Finding a good set of parameters is time-consuming, and often challenging, because the set of parameters define a large multi-dimensional space that may need to be searched thoroughly to find an acceptable parameter set. Manual approaches to finding a good parameter set are especially difficult and time-consuming when the parameter space includes continuous variables, or many discrete values per dimension.

SUMMARY OF THE INVENTION

Rather than manually choose a parameter set, the user simply prepares one or more marked images of objects to be located and/or inspected, each image having markings made by the user that indicate the location and extent of each object or objects in the image to be located and/or inspected by the machine vision tool.

An object can consist of one or more parts, and a marking can be a bounding box that includes all the parts, such as a minimum enclosing rectangle, or the marking can be a line traced along the boundary of a single object, for example. In this way, the user is actually using human pattern recognition and pattern location, and the marking on the image represents a human search result due to human pattern recognition and human pattern location. This human search result is then compared to the corresponding computed search result of the machine vision tool using (induced by) a particular parameter set for determining the location and/or other measures of the same object in the same image. The combination of the human search result and the corresponding computed search result induced by a parameter set is referred to herein as an "image result pair".

When a first image result pair is provided to the invention, each image result pair corresponding to a unique parameter set of the machine vision tool, a comparison result vector is computed that represents the difference between the human image result and the corresponding computed image result induced by the parameter set. An image result is a set of measures describing zero or more found objects. The comparison result vector characterizes differences between measures in the human image result and the computed image result—such as one or more of the following types of differences: an object found in the human image result was found with similar measures in the computed image result, an object found in the human image result was not found in the corresponding computed image result, an object which was not in the human image result was found in the corresponding computed image result, and an object found in the human image result was found with dissimilar measures in the computed image result. Note that a comparison result vector must describe complete agreement between the human image result and the computed image result in order for the computed image result to completely match and to be considered a correct result. If any of the objects found in the human image result do not have corresponding similar objects in the computed image result, or if there are extra objects in the computed image result, or if the objects found in the human image result do not match the objects found in the computed image result to within a specified tolerance, then the computed image result is said to be incorrect (and the comparison result vector describes that the human image result and the computed image result do not match). Since the invention seeks a superior parameter set selected from many possible parameter sets, a second parameter set is then generated and used to induce a second image result pair, and to generate a second comparison result vector.

Next, the second comparison result vector is compared with the first comparison result vector measure to determine which associated parameter set is "better". This comparison is performed using a result comparison heuristic method, further discussed below. A comparison result vector is more than just a single number, and the comparison of two comparison result vectors is more complicated than comparing two numbers to determine which is greater.

Although only one image result pair has been mentioned, the method of the invention typically is performed using a plurality of pairs of images (each pair being a computed image result and a human image result). The overall comparison results incorporate the comparison result for each image pair.

The invention is useful for automatically selecting a superior machine vision tool parameter set for many different general and specialized machine vision tools. Parameters for search and inspection machine vision tools can be determined using the invention, for example. Also, superior parameters for a specialized machine vision tool, such as "Probe Mark Inspection" (PMI) can be found.

For example, in the case of PMI, the task is: given a set of images and user-supplied pad models and probe mark extents, determine the optimal PMI parameters which would induce measuring probe marks approximately equal to the user-supplied probe mark extents.

The basic approach is "generate and test", wherein candidate PMI parameters are generated and scored using a customer-marked set of images.

To improve computational performance, a "coarse-to-fine" strategy is employed, wherein the invention first determines an approximate set of PMI parameters using a subset of the customer-marked images, and then the invention refines the set of machine vision tool parameters.

The method of the invention does not find the true "optimal" machine vision tool parameter set. Typically, a customer is mainly concerned with ease-of-use and simplifying the task of determining machine vision tool parameters. Thus, the invention provides an automated and therefore easy and simple means for determining machine vision tool parameters. In the case of PMI, for example, a user of the invention can expect that about 99% of the time, the PMI automatic parameter setup works fine—especially on simple, clean, images. When it doesn't work well, i.e., when the resulting PMI functions don't find any probe marks or find extraneous marks, this is probably due to attempting to find a good parameter set for a plurality of complicated images, and it may not be possible for any automated parameter selection method to find a parameter set result which induces the desired results for such a plurality of complicated images.

Also, it's reasonable to allow a relatively long computational time for the method of the invention to provide a superior parameter set. For example, up to 60 seconds is a reasonable delay for a relatively fast computer, because the phase when the method of the invention would be used is typically part of "set-up" or "training", and the resulting parameter set is typically used repeatedly at run-time.

So, for example, if PMI returns an incorrect result (a computed image result which does not match the result expected by the user), a user then includes the image which gave the incorrect result in the training set, and then uses the method of the invention to re-compute the parameter set. As a result, the method of the invention will require only a reasonably comfortable time, e.g., 5-10 minutes, to determine a better set of machine vision tool parameters.

Note that the method of the invention can be used to determine a good set of parameters anywhere it has access to image data. Thus, it is not limited to being used at the location where images are acquired, such as on a "prober", in the case of PMI.

Note also that some images can be completely blank, and the corresponding desired image result would be "No object found" (in this case, the "no object found" constitutes one measure). Note that blank images, or negative examples, are cases where a "No object found" result is desired. Such cases are at least as important, if not more important, than images which contain objects. In order to improve overall robustness performance, we recommended including some negative examples (such as blank images, or scenes where there are no marks) in the image dataset used by this method. Thereby, the machine vision tool will have been tested with blank images, and its performance on these blank images will have been included when determining the optimal parameter configuration.

Accordingly, one general aspect of the invention is a method for automatically determining machine vision tool parameters. The method includes: providing at least one image, and providing a desired image result for each image of the at least one image, each desired image result including at least a desired measure of an object in each of the at least one image. The method then includes selecting a combination of machine vision tool parameters, and running the machine vision tool on the at least one image using the combination of machine vision tool parameters so as to provide a computed image result for each image of the at least one image, each computed image result including a plurality of computed measures. The method next includes comparing each desired image result with a corresponding computed image result so as to provide a comparison result vector associated with the combination of machine vision tool parameters, and then comparing the comparison result vector associated with the combination of machine vision tool parameters to a previously computed comparison result vector associated with a previous combination of machine vision tool parameters to determine which combination of machine vision tool parameters is better, thereby providing an incumbent best combination of vision tool parameters.

In a preferred embodiment, the method further includes: saving the incumbent best combination of machine vision tool parameters; and providing the incumbent best combination of machine vision tool parameters as a best overall machine vision tool parameter combination, if there are no more parameter combinations to evaluate.

In a preferred embodiment, providing a desired image result for each image of the at least one image includes: enabling a user to mark the at least one image so as to provide a marked image, each marked image having marking that indicates a location and an extent of each object in the image; and extracting the marking so as to provide the desired image result, and at least a desired measure of the at least one object in the image. In a further preferred embodiment, the marking is a bounding box. In a yet further preferred embodiment, the bounding box is an axis-aligned bounding box, and is specified by four measures. In a still further embodiment, the four measures are: upper left-hand X, upper left-hand Y, lower right-hand X, lower right-hand Y. In an alternate preferred embodiment, the bounding box is a rotated bounding box, and is specified by five measures. In a further preferred embodiment, the five measures are: upper left-hand X, upper left hand Y, lower right hand X, lower right hand Y, and a rotational measure that represents a rotation of the bounding box about an upper left hand corner of the bounding box.

In a preferred embodiment, the bounding box is a minimum enclosing rectangle.

In another preferred embodiment, the marking is a line traced along an object boundary.

In yet another preferred embodiment, the desired measure of an object in each of the at least one image includes a pose of a feature in the at least one image. In a further preferred embodiment, the pose is characterized by six measures.

In another preferred embodiment, the method is repeated as many times as a number of available machine vision tool parameter combinations.

In some preferred embodiments, the method is performed on a set of images, and the at least one image is a member of the set.

In preferred embodiments, the method produces a set of image pairs, each image pair including a computed image result and a marked image.

In preferred embodiments, selecting a combination of machine vision tool parameters includes: estimating a combination of machine vision tool parameters using a plurality of desired image results.

In preferred embodiments, comparing the comparison result vector associated with the combination of machine vision tool parameters to a previously computed comparison result vector associated with a previous combination of machine vision tool parameters includes: comparing the comparison result vector to a previously computed comparison result vector using a result comparison heuristic method. In further preferred embodiments, the result comparison heuristic method includes: looking at major differences first, then medium differences, and then minor differences. In other further preferred embodiments, the result comparison heuristic method includes: comparing aspects of the comparison result vectors in order of decreasing importance.

In still further preferred embodiments, if there is a major difference, then prefer the comparison result vector which is better in terms of the major difference, else if there are no major differences, then look at the medium differences. In further preferred embodiments, if there is a medium difference, then prefer the comparison result vector which is better in terms of the medium difference, else if there are no medium differences, then look at the minor differences. In yet further preferred embodiments, if there is a minor difference, then prefer the comparison result vector which is better in terms of the minor difference.

In some preferred embodiments, the major differences include at least one of: registering objects for inspection, when registration is a prerequisite; a significant difference in the number of correctly inspected images. In a further preferred embodiment, wherein the significant difference is a difference of at least 2.5 percent, the number of correctly inspected images in one comparison result vector must exceed the number of correctly inspected images in the other comparison result vector by 2.5% of the larger number; a number of examples of a particularly undesirable failure mode; a number of extra things; and a number of missing things. In some preferred embodiments, the medium differences include at least one of: the total area of extra things, wherein the total area of extra things in one comparison result vector must exceed the total area of extra things in the other comparison result vector by 25% of the larger number; and the total area of missing medium things, wherein the total area of missing things in one comparison result vector must exceed the total area of missing things in the other comparison result vector by 25% of the larger number. In some preferred embodiments, the small differences include at least one of: an average distance between human image result boundaries and computed image result boundaries for matched boundaries; a number of extra small things; a number of missing small things; and aggregate geometric discrepancies. Note that in the preferred embodiment, the term "missing" signifies not being matched to within a certain tolerance—a result which only measures a portion of a big thing is defined as being "missing". In some other preferred embodiments, partial matches can be considered according to the amount of mismatch—i.e., if the computed image result mostly matches the desired image result, and only a small portion is not contained in the desired image result, but not in the computed image result, then this would be defined as a small difference.

In a preferred embodiment, extra found things are considered more significant than missing things. Medium differences include: more images with extra found things, or more extra found things, or a larger total area of extra found things (where the larger total area exceeds the smaller total area by at least 25% of the larger total area), smaller differences include: more images with missing things, or more missing things, or a larger total area of missing things (where the larger total area exceeds the smaller total area by at least 25% of the larger total area).

In a preferred embodiment, running the machine vision tool on at least one image using the combination of machine vision tool parameters includes running the machine vision tool on a plurality of images.

In preferred embodiments, comparing each desired image result with a corresponding computed image result so as to provide a comparison result vector associated with the combination of machine vision tool parameters includes: comparing boundaries in the desired image result with any corresponding boundaries in a corresponding computed image result. In further preferred embodiments, comparing boundaries in the desired image result with any corresponding boundaries in a corresponding computed image result includes: making a first boundary list from the desired image result, and a second boundary list from the corresponding computed image result; determining a closest pair of boundaries, one boundary from each of the first boundary list and the second boundary list; determining whether the closest pair of boundaries is closer in distance than a threshold distance measure; and if the closest pair of boundaries is closer than the threshold distance measure, then add the closest pair of boundaries to a matched list, wherein distance is measured in terms of the maximum distance from a point on one of the boundaries to the closest point in the interior of the other boundary. In further preferred embodiments, if the closest pair of boundaries is not closer than the threshold distance measure, then add the closest pair of boundaries to their respective not-found lists. In yet further preferred embodiments, removing from consideration the closest pair of boundaries that is not closer than the threshold distance measure before again determining a closest pair of boundaries, one boundary from each of the first boundary list and the second boundary list. In still further preferred embodiments, if removing from consideration the closest pair of boundaries that is not closer than the threshold distance measure results in either an empty first boundary list, or an empty second boundary list, then include any boundary list of the first boundary list and the second boundary list that is not empty in their respective not-found lists. Note that there are two not-found lists: one for boundaries from the first boundary list, and one for boundaries from the second boundary list. Two distinct boundary lists are used in order to distinguish between extra results (not found in the human image result but found in the computer image result) and missing results (found in the human image result but not found in the computer image result).

In preferred embodiments, the thresholds which are used to check whether two measures are sufficiently similar are measure-specific. When mark boundaries are compared, the threshold tolerance is set to three pixels so that boundaries can differ by a maximal distance of up to three pixels and still be considered matching (found). When comparing pad pose measurements, for example, all pose differences are accepted—the only criterion is that all of the pads which are found in the human image result are found in the computed image result.

In preferred embodiments, comparing each desired image result with a corresponding computed image result so as to provide a comparison result vector associated with the combination of machine vision tool parameters includes: comparing bounding boxes in the desired image result with any corresponding bounding boxes in a corresponding computed image result. In further preferred embodiments, comparing bounding boxes in the desired image result with any corresponding bounding boxes in a corresponding computed image result includes: making a first bounding box list from the desired image result, and a second bounding box list from the corresponding computed image result; determining a closest pair of bounding boxes, one bounding box from each of the first bounding box list and the second bounding box list; determining whether the closest pair of bounding boxes is closer than a threshold distance measure; and if the closest pair of bounding boxes is closer than the threshold distance measure, then the closest pair of bounding boxes is added to a matched list. Note that distance is measured in terms of the maximum distance from a point on one of the boundaries to the closest point in the interior of the other boundary. In further preferred embodiments, if the closest pair of bounding boxes is not closer than the threshold distance measure, then the closest pair of bounding boxes is added to their respective not-found lists. In further preferred embodiments, removing from consideration the closest pair of bounding boxes that is not closer than the threshold distance measure before again determining a closest pair of bounding boxes, one bounding box from each of the first bounding box list and the second bounding box list. In yet further preferred embodiments, if removing from consideration the closest pair of bounding boxes that is not closer than the threshold distance measure results in either an empty first bounding box list, or an empty second bounding box list, then include any bounding box list of the first bounding box list and the second bounding box list that is not empty in their respective not-found lists. Note that there are two not-found lists: one for boundaries from the first boundary list, and one for boundaries from the second boundary list.

Note that a desired image result includes one or more measures. For example, a desired image result can include multiple bounding boxes. Note that a computed image result includes one or more measures. For example a computed image result can include multiple bounding boxes.

In preferred embodiments, a computed image result is said to match a desired image result if all of the measures match— for example, if the desired image result includes one found defect enclosed by a box with corners at (10,20) and (30,40), and the computed image result includes one found defect enclosed by a box with corners at (10,20) and (30,40), then the desired image result is said to match the computed image result. Another example is when the desired image result includes two found defects enclosed by boxes, one with corners at (5,15) and (25,25) and another with corners at (45,45) and (50,55), and the computed image result includes one found defect enclosed by a box with corners at (45,45) and (50,55) then these two results are said to not match (because the computed image result is missing one of the desired image results). Furthermore, the computed image result is said to be missing one set of measures—a box with corners at (5,15) and (25,25).

In preferred embodiments, comparing each desired image result with a corresponding computed image result so as to provide a comparison result vector associated with the combination of machine vision tool parameters includes at least one of: incorporating as an aspect of the comparison result vector a number of correct match images, wherein the number of correct match images is the number of images where the computed image results induced by the combination of vision tool parameters each match the corresponding desired image results with respect to a set of measure-specific match thresholds; incorporating as an aspect of the comparison result vector a number of missing result images, wherein the number of missing result images is the number of images where some of the computed image results induced by the combination of vision tool parameters do not match the desired image results with respect to a set of measure-specific match thresholds; incorporating as an aspect of the comparison result vector a number of extra result images, wherein the number of extra result images is the number of images where the number of computed image results induced by the combination of vision tool parameters do not match any of the desired image results to within a match threshold; incorporating as an aspect of the comparison result vector a number of correct match instances, wherein the number of correct match instances is the number of instances where a computed image result induced by the combination of vision tool parameters matches a corresponding desired image result to within a measure-specific match threshold; incorporating as an aspect of the comparison result vector a number of missing result instances, wherein the number of missing result instances is the number of instances where there is not a computed image result induced by the combination of vision tool parameters that matches a corresponding desired image result to within a measure-specific match threshold; incorporating as an aspect of the comparison result vector a number of extra result instances, wherein the number of extra result instances is the number of instances of computed image results induced by the combination of vision tool parameters that do not match any of the desired image results to within a match threshold. Note that a result is considered to be matched if all of the measures match (i.e., all of the bounding boxes in the computed image result match all of the bounding boxes in the desired image result) to within their respective measure-specific match thresholds; incorporating as an aspect of the comparison result vector a total area of missing result instances, wherein the total area of missing result instances is the total area of instances where at least one of the measures in the computed image result induced by the combination of vision tool parameters does not match one of the measures in the corresponding desired image result to within a measure-specific match threshold; incorporating as an aspect of the comparison result vector a maximum area of missing result instances, wherein the maximum area of missing result instances is the maximum area among all instances where there is not a computed image result induced by the combination of vision tool parameters that matches a corresponding desired image results to within a measure-specific match threshold; incorporating as an aspect of the comparison result vector a total area of extra result instances, wherein the total area of extra result instances is the total area of instances of computed image results induced by the combination of vision tool parameters that do not match any of the desired image results to within a measure-specific match threshold; incorporating as an aspect of the comparison result vector a maximum area of extra result instances, wherein the maximum area of extra result instances is the maximum area among all instances of computed image results induced by the combination of vision tool parameters that do not match any of the desired image results to within a measure-specific match threshold; incorporating as an aspect of the comparison result vector a total area of correct match instances, wherein the total area of correct match instances is the total area of instances where a computed image result induced by the combination of vision tool parameters matches a corresponding desired image result to within a measure-specific match threshold; incorporating as an aspect of the comparison result vector a maximum area of correct match instances, wherein the maximum area of correct match instances is the maximum area among all instances where a computed image result induced by the combination of vision tool parameters matches a corresponding desired image result to within a measure-specific match threshold; incorporating as an aspect of the comparison result vector a number of correct registration images, wherein the number of correct registration images is the number of images where the computed image results induced by the combination of vision tool parameters all together match the corresponding desired image results to within a measure-specific registration threshold; and incorporating as an aspect of the comparison result vector any derived quantity based on at least one of theses foregoing aspects.

In another general aspect of the invention, a method for automatically determining machine vision tool parameters includes: providing at least one image, and a desired image result for each image of the at least one image, the desired image result including at least a desired measure of an object in each of the at least one image; using the at least one image, and the desired image result for each image of the at least one image, having a computer automatically determine an optimal set of machine vision tool parameters.

In a preferred embodiment, the method further includes: performing a two step process where, in the first step, the set of possible parameters is extensively sampled in order to determine a "sufficiently good" choice of parameters, and in the second step, that "sufficiently good" choice of parameters is further refined to provide a "locally-maximally good" choice of parameters.

The method of the invention does not exhaustively search the parameter set in order to find the true "optimal" machine vision parameter set—this may not be possible if the parameters are continuous values since there are infinitely many possible choices for a continuous parameter.

In preferred embodiments, the first step involves extensively sampling the parameter space in order to find a sufficiently good parameter set. This can be necessary because the performance of a machine vision tool may be extremely dependent upon parameters—so a random parameter set may not provide sufficiently good results for refinement to work.

In preferred embodiments, the first step for extensively sampling the parameter space in order to provide a "sufficiently good" parameter set involves randomly selecting a subset of the "image result pairs" in order to minimize the execution time of the first step. The size of the subset is the minimum of the original number of "image result pairs", and the number sixty four. Therefore, if the original number of "image result pairs" is larger than sixty four, then only sixty four "image result pairs" are used for extensively sampling the parameter space in order to provide a "sufficiently good" parameter set, and if the original number of "image result pairs" is less than or equal to sixty four, then all of the original "image result pairs" are used in the first step to compute the "sufficiently good" parameter set. Note that the number sixty four was selected because it is a relatively large number. In other preferred embodiments, sizes other than sixty four are used for the random subset for the first step for determining the "sufficiently good" parameter set.

In preferred embodiments, heuristics are used to prune the extensive set of parameters to be tested. For example, in PMI, the inspection application is separated into two steps—registering the bond pad, and then inspecting the registered pad. As such, we can first determine the "sufficiently good" set of registration parameters, and then only consider those registration parameters while we enumerate inspection parameters in the second step. We enumerate registration parameter choices (e.g., useFinestCoarseGranularity, doPreprocessingBeforeRegistration, and useCompositeModel) in order to determine which set of registration parameters induces the maximal number of correct registration results. Then, we only consider "optimal" registration parameters and only enumerate the extensive set of inspection parameters.

In preferred embodiments, we use heuristics to prune the set of extensive inspection parameters by using a coarse->fine strategy wherein we first coarsely sample the inspection parameter choices. In preferred embodiments, only even values of the randomTextureParameter are tried even though both even and odd values are valid. In preferred embodiments, only lowAccuracyTextureRemoval is tried. Each of these parameter sets is associated with the induced respective comparison result vectors. These comparison result vectors are sorted by the comparison heuristic outlined above. Then, the worse performing parameters are discarded (only the top 25% of parameters are kept). Then, to sample more finely, starting with these top 25% parameters, we exhaustively try all neighbors for each of these "top" parameters (such as the odd randomTextureParams above and below the coarse param's even randomTextureParams, and simultaneously also trying both lowAccuracyTextureRemoval and highAccuracyTextureRemoval). After trying all of the parameters which are nearby the top 25%, the comparison results are again compared and the only the single best parameter is kept.

In preferred embodiments, the extensive parameter sampling utilizes heuristics in order to prune the set of sampled parameters. This is done to reduce the total execution time (in order to provide results in a timely fashion). In PMI, for example, one of the heuristics is to separate the PMI parameters into PMI registration parameters and PMI inspection parameters. First, we determine a sufficiently good set of PMI registration parameters, and then, second, we use that set of PMI registration parameters to determine a sufficiently good set of PMI inspection parameters. Since the number of configurations is exponential in the number of parameters, this heuristic prunes the number of analyzed combinations from: num(registrationParams)*num(inspectionParams) to num ("good" registrationParams)*num(inspectionParams)

In other preferred embodiments, the user would supply an initial choice of "sufficiently good" parameters, and the invention would refine that selected set of parameters. In the next step, the invention refines that best choice of randomly selected parameters.

In other preferred embodiments, the invention would randomly select one or more sets of machine vision tool parameters, and then run the machine vision tool using those parameters in order to find the best performing machine vision tool parameters from the randomly selected set. In the next step, the invention refines that best choice of randomly selected parameters.

In still another general aspect of the invention, a method for automatically determining machine vision tool parameters includes: providing a plurality of images, and providing a desired image result for each image of the plurality of images, each desired image result including at least a desired measure of an object in each of the plurality of images; selecting a combination of machine vision tool parameters; running the machine vision tool on the plurality of images using the combination of machine vision tool parameters so as to provide a computed image result for each image of the plurality of images, each computed image result including a plurality of computed measures; comparing each desired image result with a corresponding computed image result so as to provide a comparison result vector associated with the combination of machine vision tool parameters; comparing the comparison result vector associated with the combination of machine vision tool parameters to a previously computed comparison result vector associated with a previous combination of machine vision tool parameters to determine which combination of machine vision tool parameters is better, thereby providing an incumbent best combination of vision tool parameters; saving the incumbent best combination of machine vision tool parameters; and providing the incumbent best combination of machine vision tool parameters as a best overall machine vision tool parameter combination, if there are no more parameter combinations to evaluate.

In preferred embodiments, comparing the comparison result vector associated with the combination of machine vision tool parameters to a previously computed comparison result vector associated with a previous combination of machine vision tool parameters includes comparing the comparison result vector to a previously computed comparison result vector using a result comparison heuristic method.

BRIEF DESCRIPTION OF THE DRAWING

The invention will be more fully understood by reference to the detailed description, in conjunction with the following figures, wherein.

DETAILED DESCRIPTION

Using a "generate and test" strategy, a plurality of machine vision tool parameter set candidates are generated, and then each of these vision tool parameter set candidates is scored and compared using a heuristic. Note that it is not necessary to generate all possible vision tool parameter set candidates, because a user is mostly concerned with automatically determining a good "working" vision tool parameter set.

Figure 1:
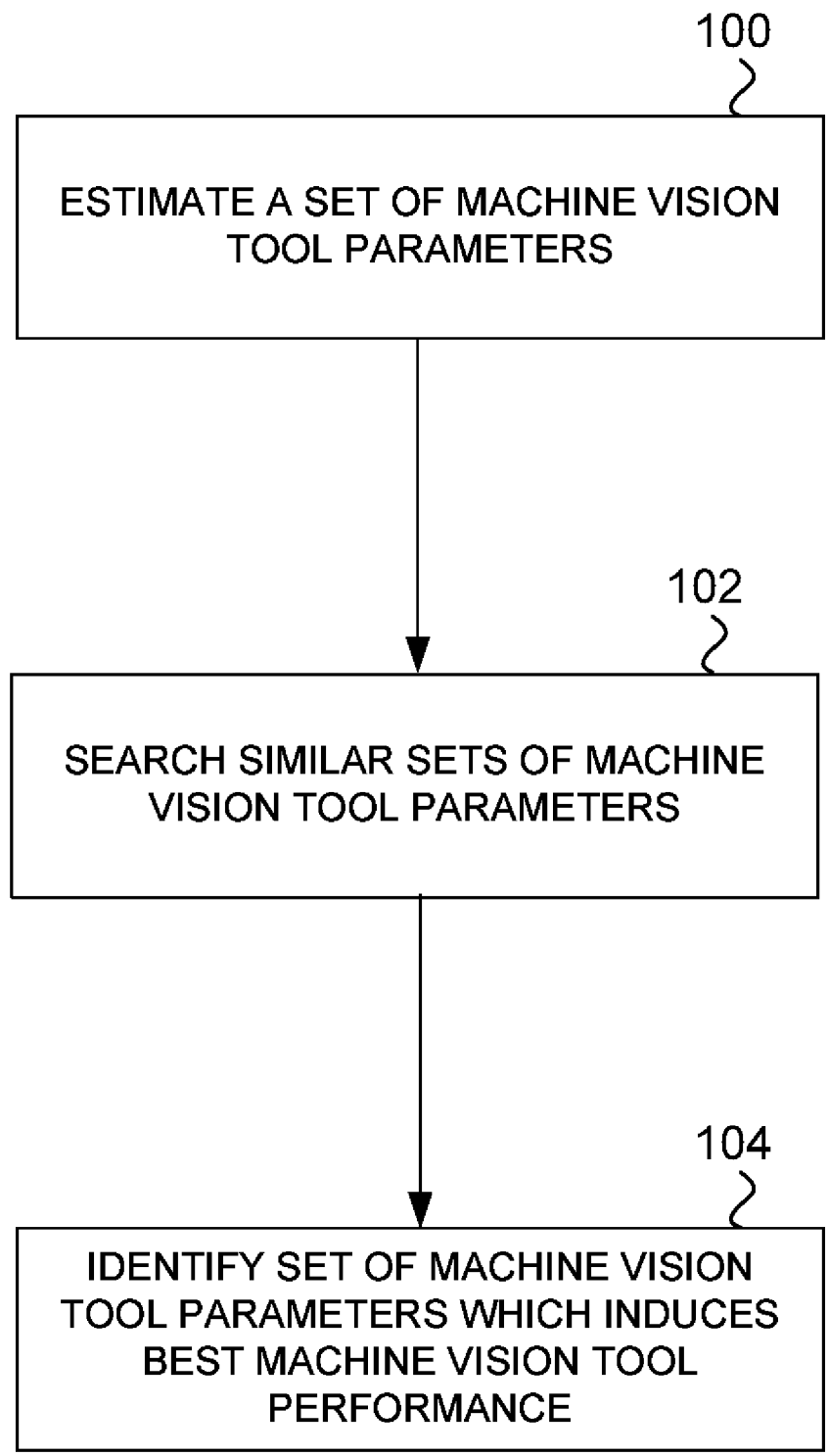
FIG. 1 is a flow diagram showing a general approach of the method of the invention.

The general strategy is depicted in FIG. 1. A user first supplies a set of images and corresponding desired results. Then, the invention roughly estimates a set of machine vision tool parameters 100. It may be useful to use image pre-processing of a plurality of images, but this is not necessary. Depending on the particular machine vision application, the image preprocessing could include a frequency analysis to determine dominant frequencies; a histogram analysis to determine dominant gray values, or a histogram analysis of edge detection results to determine a dominant orientation. The pre-processing can help limit and/or determine some of the machine vision tool parameters. Alternatively, a user experienced with the particular application and the machine vision tools to be used can make educated guesses as to possible parameters and/or parameter ranges.

Generally, the method of the invention employs a combination of extensive searching and "neighbor search" search wherein given "incumbent best machine vision tool parameter set", adjacent parameter sets are tried which differ only by a single parameter 102. In some applications, the combination of extensive searching and neighbor search can be applied using a coarse-to-fine strategy. The term neighbor search means only considering parameter sets which differ in one parameter value (adjacent parameter set) from the current best parameter set. If an adjacent parameter set is better, then it becomes the best parameter set so far, and a new different adjacent parameter set is generated, and then tested against the incumbent, until a set of machine vision parameters is identified which induces the best machine vision tool performance 104, as will be explained in further detail below. For some machine vision tool applications, such as PMI, there is not a single "score" which represents the "goodness" or "best" of the machine vision tool parameters. Instead, a heuristic is used to compare comparison result vectors associated with each combination of machine vision tool parameters, as will be explained further below. In some cases, there may be one comparison result vector A which is better than comparison result vector B, and another comparison result vector B which is better than comparison result vector C, but comparison result vector C is better than comparison result vector A. For this reason, an incumbent "best" combination of machine vision tool parameters can be problematic (in that we could keep on switching between three parameter settings ad infinitum), but this situation rarely occurs in practice because there is usually a parameter setting which is better than all other combinations of vision tool parameters. In order to handle the cases where the choice of best setting could loop around in a cycle, the method avoids cycles by enforcing a rule to only switch once between two parameter configurations.

Figure 1A:
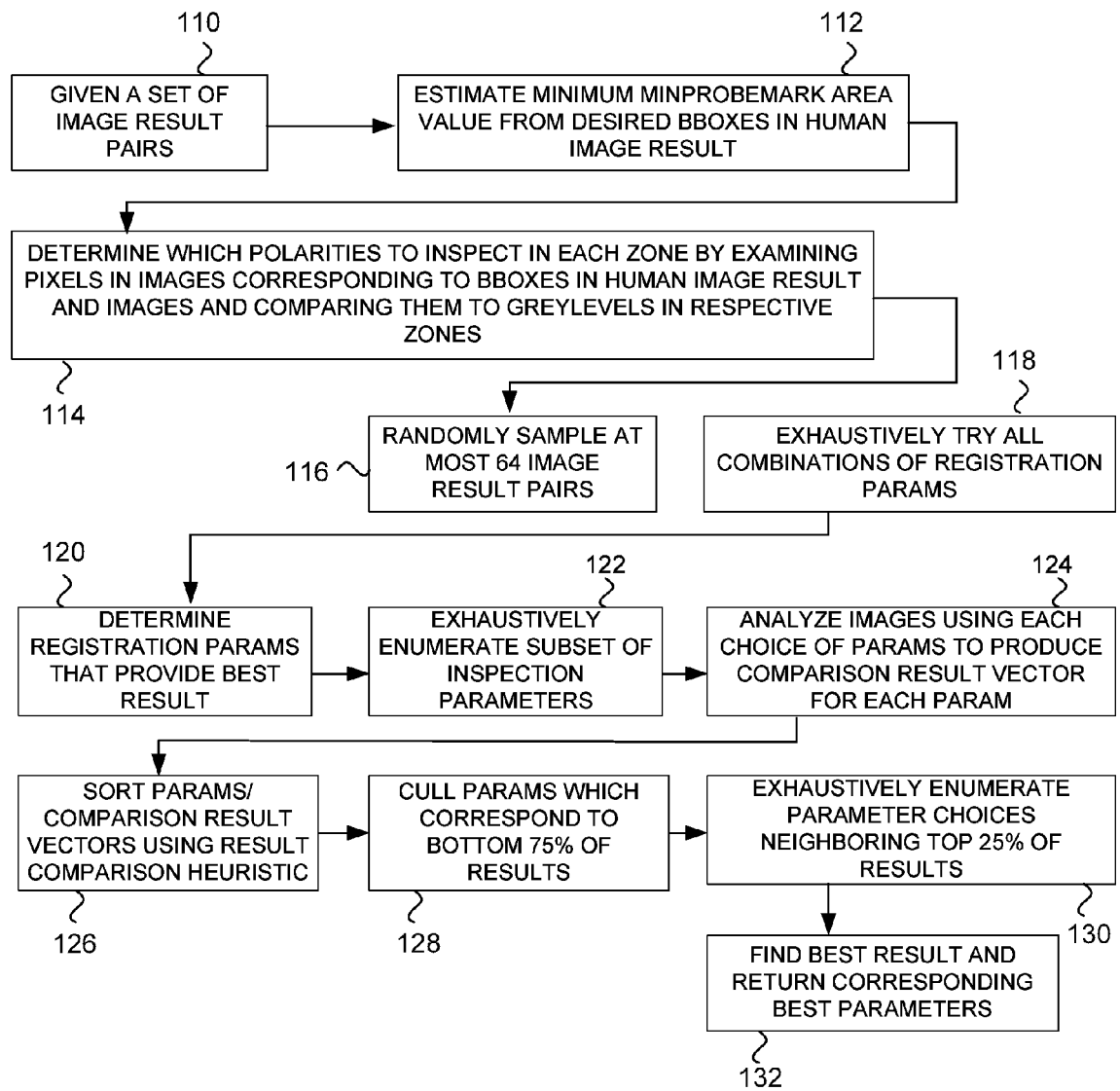
FIG. 1A is a flow diagram showing an extensive search strategy as applied to PMI.

With reference to FIG. 1A, in PMI, for example, the extensive search strategy of the invention takes as input a set of image result pairs 110. First the strategy of the invention performs image processing on the image result pairs in order to determine: minimum expected probe mark sizes, which polarities need to be inspected in each zone, and whether or not texture removal image preprocessing should be performed. Note that the extensive search strategy will set the PMI inspection parameters based upon the image processing results, but that the subsequent refinement step can update these PMI inspection parameters.

The minimum expected probe mark size is determined by simply examining the human image results which specify the expected probe marks 112. We record the area of the smallest rectangle of the probe mark's bounding boxes specified in the image result pairs. Note that we determine a range over which we will search the minProbeMarkArea parameter—this range is defined to be 0.064*minimumExpectedProbeMarkRectangularArea to 10*minimumExpectedProbeMarkRectangularArea.

The extensive search strategy determines which polarities to inspect at each of the different inspection zones by analyzing greylevels in the images 114. The strategy computes histograms of greylevels in each zone and histograms of the greylevels of the portion of each human-computed result in each zone (note that we exclude pets which are specified to be probe marks). For the innermost zone, we determine the polarities of the probe marks by comparing the extreme values of the zone background histogram to the extreme values of the probe mark histogram—if the minimum greylevel in the probe mark is lower than the minimum greylevel of the background, then we enable inspection for dark marks in that zone; if, conversely, the maximum greylevel of the probe mark exceeds the maximum greylevel of the background, then we enable inspection of bright probe marks in that zone. For ring zones (zones that are not the innermost region), we compare the minimum and maximum greylevels of the mark to nth lowest or nth largest greylevel in the region—in this case the 25%-ile darkest greylevel and the 25%-ile lightest greylevel respectively. Note that we use PMI registration to find the extents of the pad zones. Also note that we do not, at this time, know the optimal PMI registration parameters. So, we try all combinations of PMI registration parameters (all four combinations of useCompositeModel and useFinestCoarseGranularity), and use the one which induces the fewest zonePolarity bits.

Figure 1B:
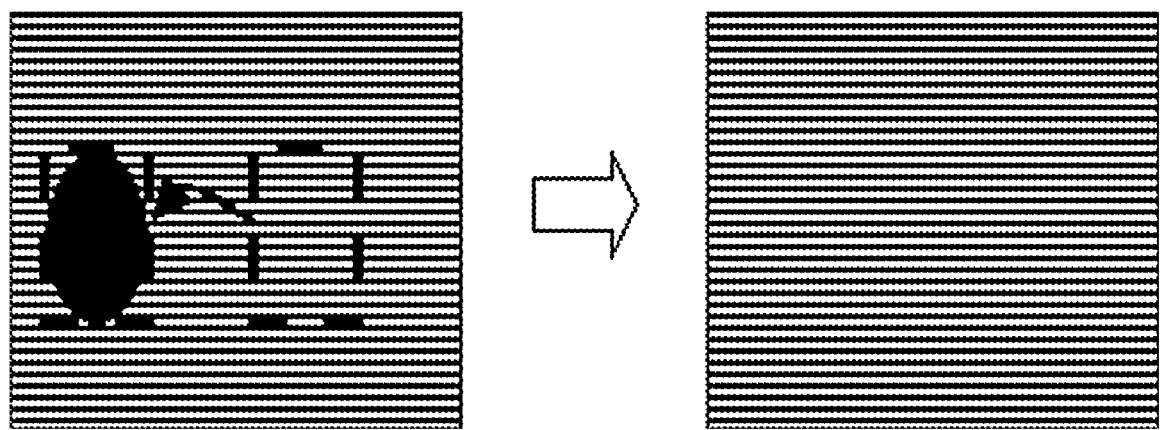
FIG. 1B is an illustration of copying the pixels in a region of the same size as the expected probe mark so as to ignore the region around the probe mark.

The strategy of the invention employs a technique which automatically determines whether or not to perform texture removal image processing. This technique involves computing a measure of the "texturiness" of the scene—in this case, it is the mean of the Sobel magnitude image (after culling the top 25%-ile largest magnitude values). The technique uniquely makes use of known positions of probe marks. Since we expect the probe mark to affect any texture measurement, we ignore the region around the probe mark while performing this computation. For striped textured pads, this is done by copying the pixels in a region of the same size as the expected probe mark and on the same line as the expected probe mark onto the pixels in the image in the neighborhood of a probe mark, as shown in FIG. 1B.

Then, the strategy randomly samples at most sixty four of those image result pairs (because fewer images take less time to process) 116. Then the strategy exhaustively tries all combinations of registration parameters 118 (consisting of useFinestCoarseGranularity, doPreprocessingBeforeRegistration, and useCompositeModel) and runs PMI registration on the images—the strategy counts the number of found pads for each choice of registration parameters—and then determines the maximum number of found pads over all choices of registration parameters. Next, the strategy of the invention culls out the choices of registration parameters which induce fewer than the maximum number of found pads 120 so as to determine the registration parameters that provide the best results. Then the strategy exhaustively enumerates subsets of inspection parameters 122 (note that the subset all use the same choice of zonePolarities—which was determined by processing the image pairs—and only uses even values of randomTextureParams and lowAccuracyTextureRemoval). Then, the strategy runs PMI image processing on all the images using all of the choices of inspection parameters so as to compute the comparison result vectors for each of the inspection parameter choices 124. Next, the strategy sorts the comparison result vectors according to the comparison heuristic 126. Next, the strategy determines the "top" 25% of the inspection parameter choices (and culls the "bottom" 75%) 128. Next, the strategy exhaustively enumerates parameter choices neighboring top 25% of results 130. Lastly, the best result is found, and the corresponding best parameters are returned 132.

Also, some PMI processing can be avoided since we can predict what the result will be without doing the machine vision tool processing. For example, the PMI function has a variable called "minProbeMarkArea". If it's known that the PMI results corresponding to a small "minProbeMarkArea" are exactly equal to the PMI results corresponding to a large "minProbeMarkArea", then it can be assumed that all of the "minProbeMarkAreas" in between will induce the same results (because there are no probe marks with areas between the small and large values). Note that the all of the PMI parameters are discrete (except minProbeMarkArea) so that space for almost all of the variables can be exhaustively searched. For the minProbeMarkArea, a binary search strategy is used—first the minProbeMarkArea parameter value is searched by considering the four other minProbeMarkArea values which are 1.089, 1.185921, 0.918273, and 0.843226 times the current minProbeMarkArea.

For speed performance reasons, a sub-sampled image search strategy can be used wherein an extensive set of the candidate combinations of machine vision tool parameters are initially run on a subset of the images. Then the best candidate combination of machine vision tool parameters is selected, and the "best" combination of vision tool parameters is refined (via neighbor searching) using the entire set of images.

Figure 2:
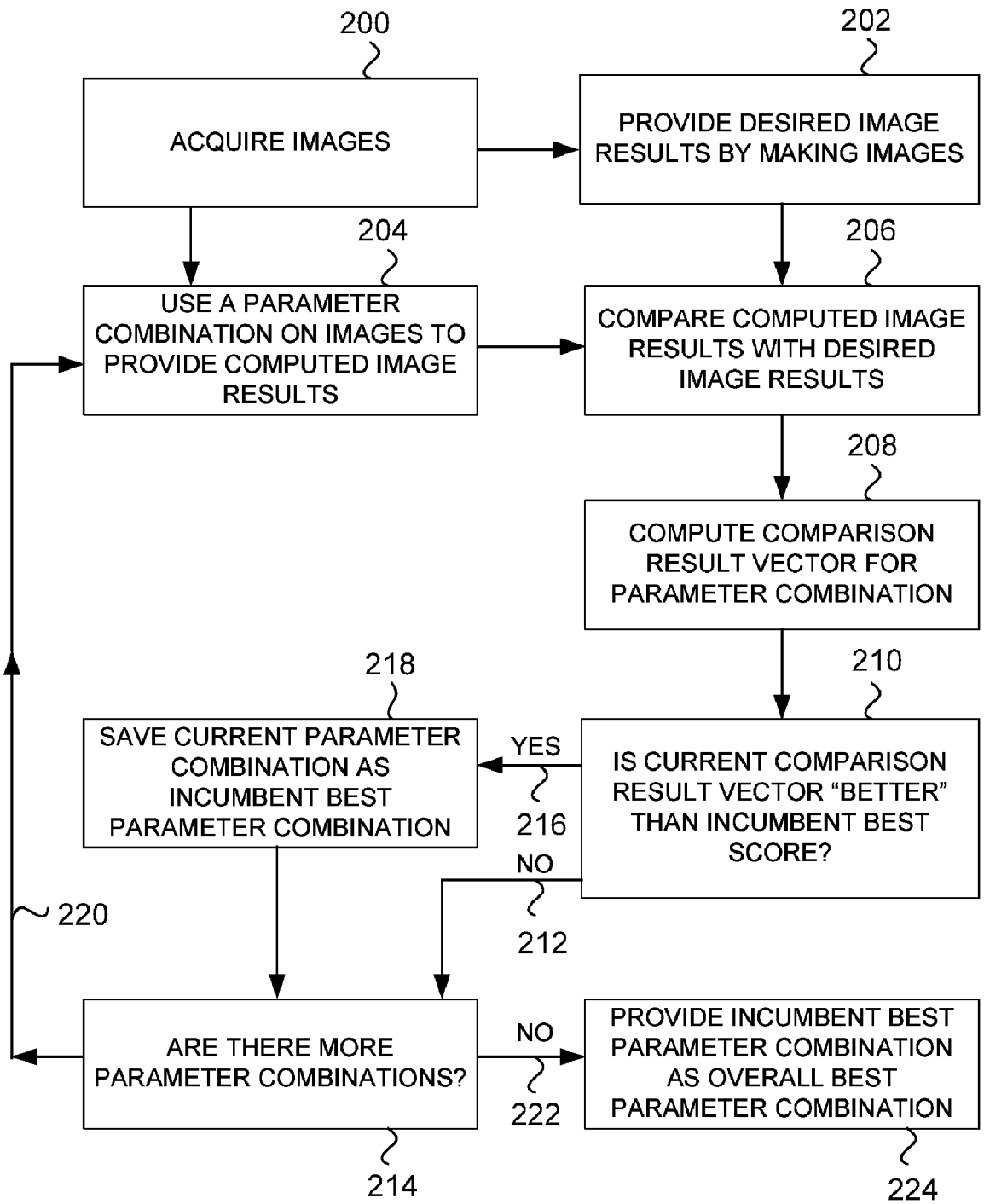
FIG. 2 is a flow diagram showing further details of the method of the invention.

Referring to FIG. 2, images are acquired 200 using any image acquisition system, such as a camera. Images can also be obtained from a pre-existing database of images. Images can be added to the images initially considered by the method of the invention if the user notices an anomalous result while using a combination of parameters, such as an incorrectly inspected result, or an incorrectly located result. In such cases, the user can mark the image, add the image with the anomalous result to the images considered by the method of the invention, and add the corresponding marked image to the training set of images, and then recompute a new combination of parameters.

The acquired images are marked 202 to indicate the desired image results that are to be obtained by the machine vision tool if the tool is supplied with a good parameter combination. These desired image results represent the user's perception of the size, shape, and location of one or more image features, for example. They can also represent desired inspection results. Such markings can be a bounding box, such as a minimum enclosing rectangle. Such markings can also be the boundary of an object as traced by the user. Such markings can alternatively be poses of objects such as bond pads.

Next, a parameter combination is selected from a set of candidate parameter combinations, and that parameter combination is used as input to run the machine vision tool 204, along with the acquired images 200. This results in a plurality of computed image results.

Then, the computed image results are compared with the corresponding desired image results 206, so as to provide a comparison result vector associated with the parameter combination 208 used to create the computed image results.

Note that the comparison result vector corresponding to a particular parameter combination is cached so as to reduce processing time in the case that the same parameter combination is analyzed more than once during the method.

Next, the current comparison result vector resulting from a current parameter combination is compared with an incumbent best comparison result vector 210 resulting from an incumbent best parameter combination.

If the current comparison result vector is not "better" than the incumbent best comparison result vector, as determined by a heuristic comparison 212, then the current parameter combination associated with the current comparison result vector is not saved, and another parameter combination is selected 214.

If the current comparison result vector is "better" than the incumbent best comparison result vector, as determined by a heuristic comparison 216, then the current parameter combination associated with the current comparison result vector is saved as the new incumbent best parameter combination 218. Then 214, if there is another parameter combination to try 220, that parameter combination is used to provide more computed image results 204. If there is not another parameter combination to try 222, then the incumbent best parameter combination is provided as the overall best parameter combination 224.

Figure 3:
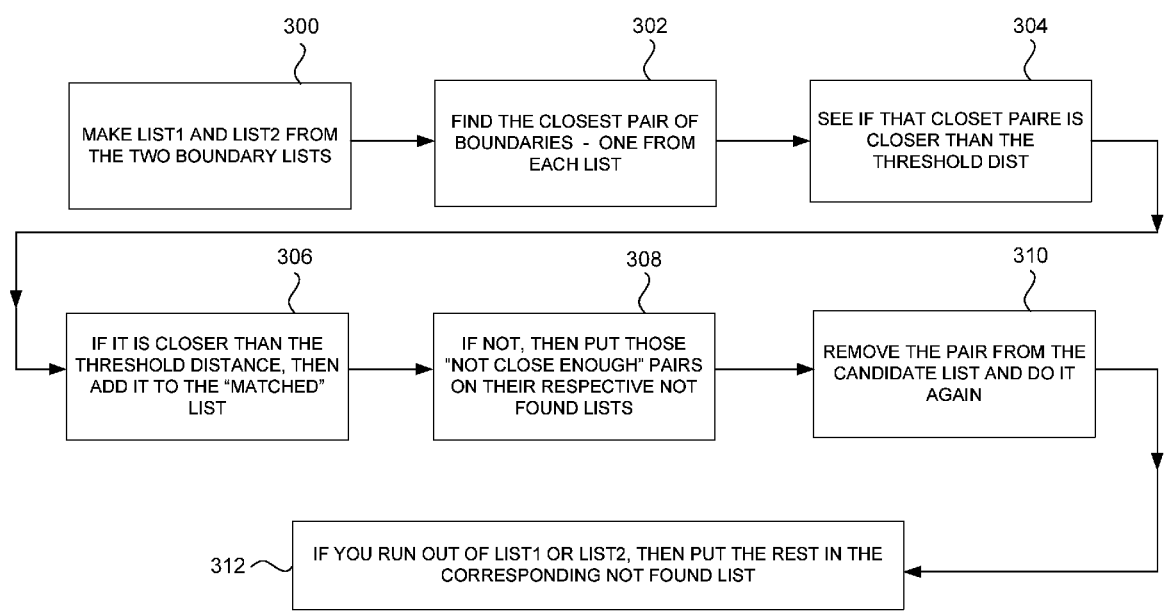
FIG. 3 is a flow diagram showing creation of "matched" list and "not found" lists.

When comparing the computed image results with the desired image results 206, and when the marking of the desired image results include object boundary markings, the method of FIG. 3 can be used.

With reference to FIG. 3, first a boundary is extracted from the computed image results, and a candidate corresponding boundary is extracted from the marked desired image results so as to form two boundary lists, one boundary list for each boundary 300. For brevity, the boundary list extracted from the computed image result is called list1, and the boundary from the desired image result is called list2.

Next, the closest pair of corresponding boundaries is found 302, one from each of the lists list1 and list2. Then, the distance between the closest pair is compared to a threshold distance 304. If the distance between the closest pair is smaller than the threshold distance, then add the closest pair to a "matched" list of matched corresponding boundaries 306. If the distance between the closest pair is not smaller than the threshold distance, then put each boundary of the "closest pair" on respective "not found" lists 308. Then, remove the "closest pair" from the lists list1 and list2 and return to step 300. If there are no elements on either list1 or list2, then put the elements from list that is not exhausted on the corresponding "not found" list 312. Note that the distance between two boundaries is defined to be the maximum distance from any point within the region enclosed by one boundary to the closest point enclosed by the other boundary.

Candidate comparison result vectors are compared using the following comparison heuristic: When deciding which comparison result vector is "better", look at major differences first, then medium differences, then minor differences. If one comparison result vector induced by a contender parameter set is "better" than another comparison result vector induced by the incumbent parameter set, then save the contender parameter set as the incumbent parameter set.

For example, major differences include differences in some important measures and significant differences in other important measures "Registering objects for inspection, when registration is a prerequisite", "the number of correctly inspected objects", "the number of examples of a particularly undesirable failure mode", the number of extra big things; the number of missing big things.

Note that in the preferred embodiment, extra results are considered more important than missing results. For example, if one comparison result vector has fewer images with extra results than another comparison result vector, the former will be considered better. If both comparison result vectors have the same number of images with extra results, then if one comparison result vector has fewer individual extra results than another comparison result vector, then the former will be considered better. If both comparison result vectors have the same numbers of extra result images and extra individual results, then if one comparison result vector has total area of extra results which is less than a thresholding constant times the total area of the extra results in the other comparison result vector, then the former will be considered better. Only if the number of extra result images is the same, and the number of individual extra results is the same, and the total area of extra results is approximately the same between two comparison result vectors, will we examine the missing results in the two comparison result vectors.

For example, medium differences include: the number of extra medium things; the number of missing medium things.

For example, minor differences include: the number of extra small things; the number of missing small things; aggregate geometric discrepancies.

Figure 4:
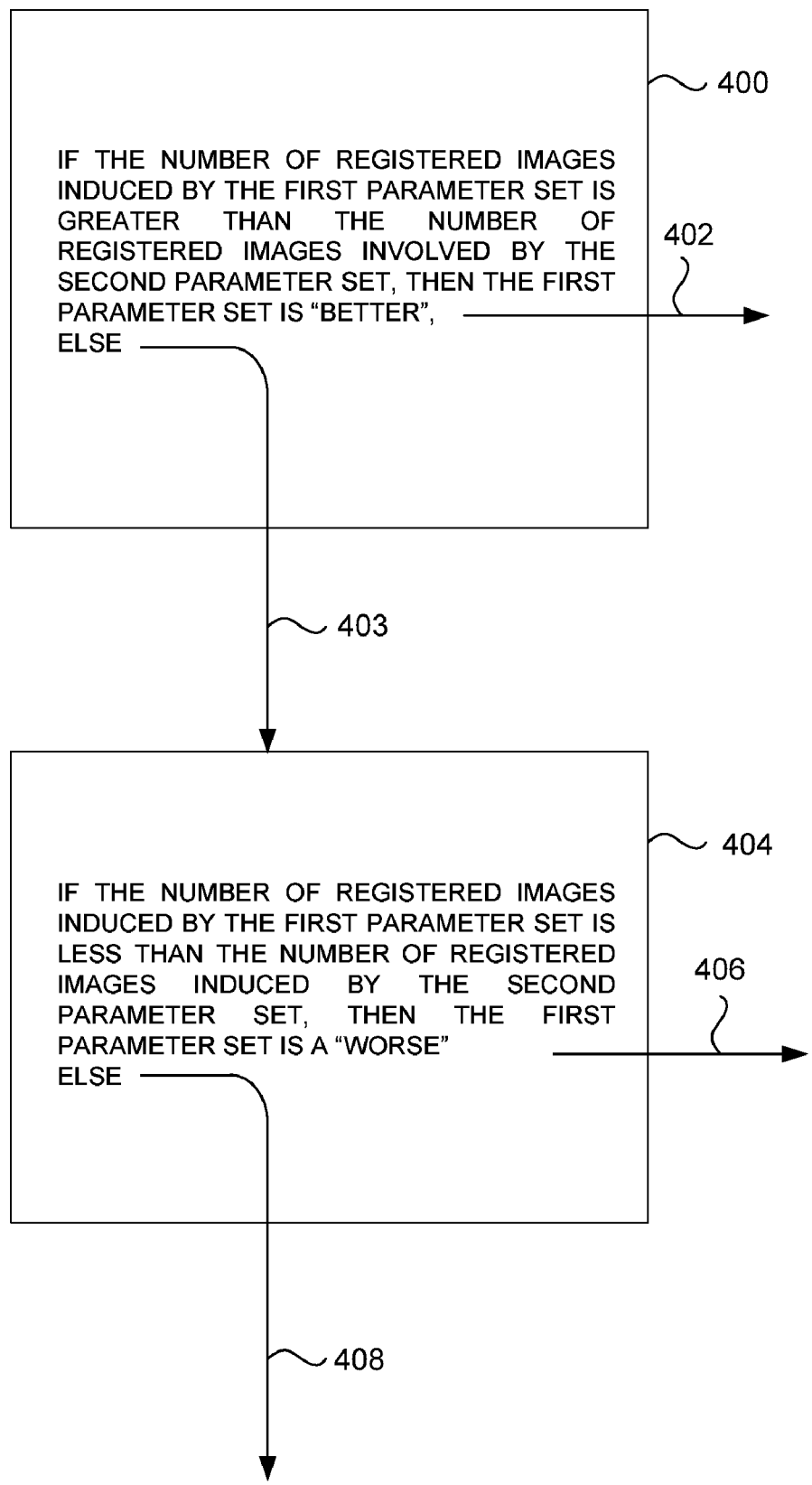
FIG. 4 is a verbally described example of a pair of comparisons that is included in a heuristic process for comparing comparison result vectors.

In the particular case of Probe Mark Inspection, for example, as shown in FIG. 4, a major difference includes the number of images where there are extra probe marks on the boundary of a pad.

If the number of images where there are extra probe marks on the boundary of the pad (induced by the first, incumbent set of inspection parameters) is significantly greater than the number of images where there are extra probe marks on the boundary of the pad (induced by the second, contender set of inspection parameters) 400 then save the second contender set of parameters as the incumbent "best" parameter set 402. By significantly greater, we mean, e.g., that the number in one case exceeds 1.025 times the other number.

Else 403, if the number of registered images induced by the first parameter set is less than the number of registered images induced by the second parameter set 404, then the first parameter set is "worse", and the second parameter set is saved as the best 406. Otherwise, if neither parameter set can be established as "better", then a next different aspect of the comparison result vectors is considered 408.

Figure 5:
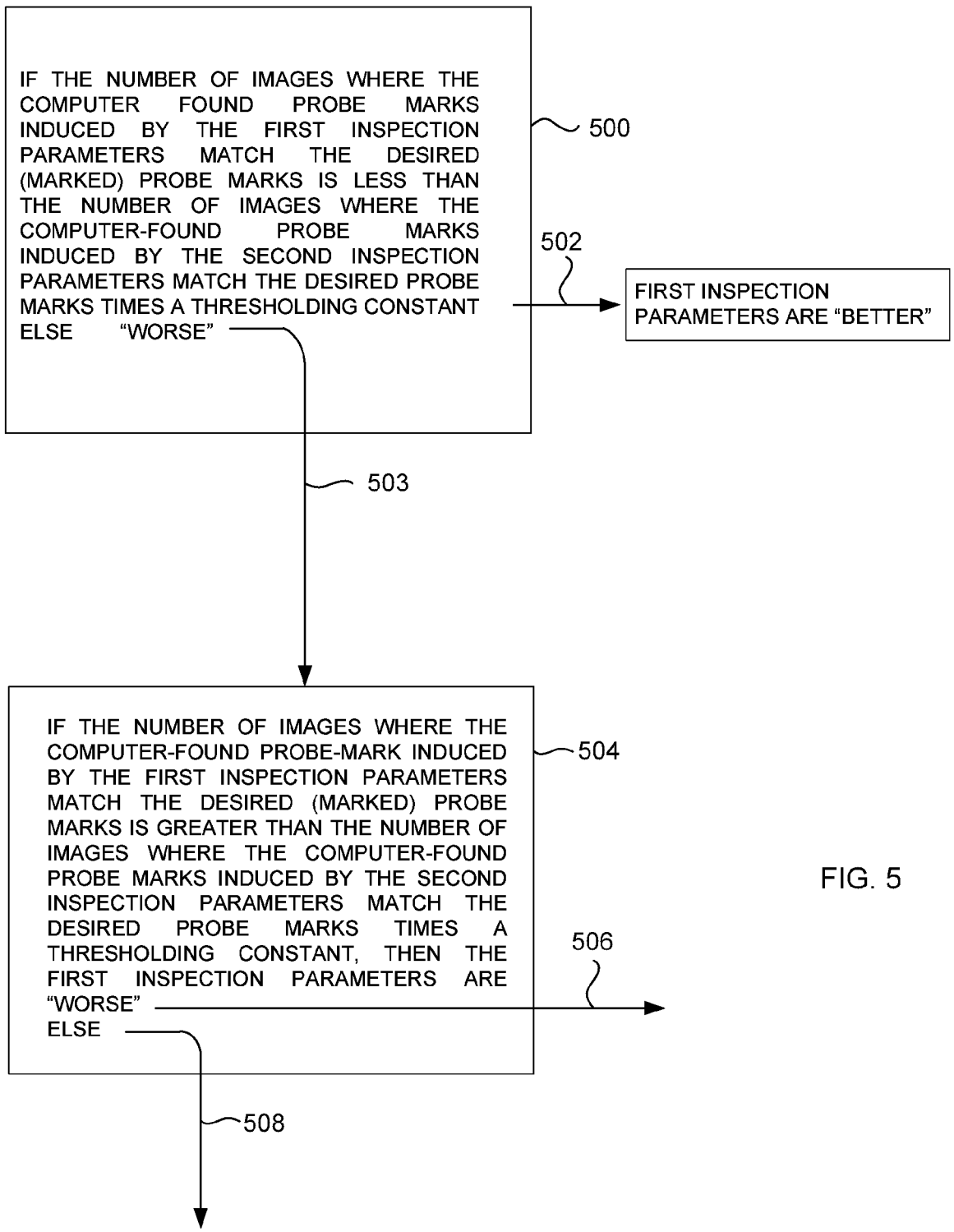
FIG. 5 is another verbally described example of a pair of comparisons that is included in a heuristic process for comparing comparison result vectors.

With reference to FIG. 5, if the number of images where the computer-found probe marks induced by the first inspection parameters match the desired (marked) probe marks is significantly less (e.g., the first value is less than 0.975 times the second value) then the number of images where the computer-found probe marks induced by the second inspection parameters match the desired probe marks times a thresholding constant 500, then the first inspection parameters are better, and are therefore saved as the incumbent "best" parameter set 502.

Else 503, if the number of images where the computer-found probe-marks induced by the first inspection parameters match the desired (marked) probe marks is significantly greater (e.g., the first value is greater than $1/0.975$ times the second value) than the number of images where the computer-found probe marks induced by the second inspection parameters match the desired probe marks times a thresholding constant 504, then the first inspection parameters are "worse", and the second inspection parameters are saved as the incumbent "best" parameter set 506. Otherwise, if neither parameter set can be established as "better", then a next different aspect of the comparison result vectors is considered 508.

Note that the criterion for determining which comparison result vector is better can be used to sort the comparison result vectors, not just to determine the best comparison result vector.

One of average skill in the art of PMI can further devise ways to compare aspects of the comparison result vector that are specific to the PMI application, and the foregoing comparisons as set forth in FIGS. 4 and 5 are provided as particular examples of a more general process of developing a heuristic for comparing comparison result vectors according to the invention wherein the method looks at major differences first, then medium differences, then minor differences. FIGS. 4 and 5 could be considered major differences, for example.

Other modifications and implementations will occur to those skilled in the art without departing from the spirit and the scope of the invention as claimed. Accordingly, the above description is not intended to limit the invention except as indicated in the following claims.

What is claimed is:

1. A method for automatically determining machine vision tool parameters, the method comprising:
   providing an image;
   providing a desired image result for the image, the desired image result including one or more markings made by a user to indicate a desired measure of each of one or more objects to be located and/or inspected in the image;
   selecting a combination of machine vision tool parameters;
   running, using a computer, a machine vision tool on the image using the combination of machine vision tool parameters so as to provide a computed image result that includes a computed measure of each of one or more objects in the image;
   comparing, using a computer, (i) the desired image result with the computed image result so as to provide a comparison result vector that characterizes differences between the desired measure of each of one or more objects in the image and the computed measure of each of one or more objects in the image; and (ii) that comparison result vector to a comparison result vector associated with a previous combination of machine vision tool parameters; and
   determining, using a computer, a combination of machine vision tool parameters that is better with respect to the differences between the desired image result and the computed image result when the machine vision tool is run on an image of a type provided.

2. The method of claim 1, further comprising:
saving an incumbent best combination of machine vision tool parameters; and
providing the incumbent best combination of machine vision tool parameters as a best overall machine vision tool parameter combination, if there are no more parameter combinations to evaluate.

3. The method of claim 1, wherein providing a desired image result for the image includes:
enabling a user to mark the image so as to provide a marked image, each marked image having marking that indicates a location and an extent of each object in the image; and
extracting the marking so as to provide the desired image result, and at least a desired measure of at least one object in the image.

4. The method of claim 3, wherein the marking is a bounding box.

5. The method of claim 4, wherein the bounding box is an axis-aligned bounding box, and is specified by four measures.

6. The method of claim 5, wherein the four measures are:
upper left-hand X, upper left-hand Y, lower right-hand X, lower right-hand Y.

7. The method of claim 4, wherein the bounding box is a rotated bounding box, and is specified by five measures.

8. The method of claim 7, wherein the five measures are:
upper left-hand X, upper left hand Y, lower right hand X, lower right hand Y, and a rotational measure that represents a rotation of the bounding box about an upper left hand corner of the bounding box.

9. The method of claim 4, wherein the bounding box is a minimum enclosing rectangle.

10. The method of claim 3, wherein the marking is a line traced along an object boundary.

11. The method of claim 1, wherein the desired measure of an object in each of the at least one image includes a pose of a feature in the at least one image.

12. The method of claim 11, wherein the pose is characterized by six measures.

13. The method of claim 1, wherein the method is repeated as many times as a number of available machine vision tool parameter combinations.

14. The method of claim 1, wherein the method is performed on a set of images, and the at least one image is a member of the set.

15. The method of claim 3, wherein the method produces a set of image pairs, each image pair including a computed image result and a marked image.

16. The method of claim 1, wherein selecting a combination of machine vision tool parameters includes:
estimating a combination of machine vision tool parameters using a plurality of desired image results.

17. The method of claim 1, wherein comparing the comparison result vector to a associated with a previous combination of machine vision tool parameters includes:
comparing the comparison result vector to a previously computed comparison result vector using a result comparison heuristic method.

18. The method of claim 17, wherein the result comparison heuristic method includes:
looking at major differences first, then medium differences, and then minor differences.

19. The method of claim 18, wherein if there is a major difference, then prefer the comparison result vector which is better in terms of the major difference, else if there are no major differences, then look at the medium differences.

20. The method of claim 19, wherein if there is a medium difference, then prefer the comparison result vector which is better in terms of the medium difference, else if there are no medium differences, then look at the minor differences.

21. The method of claim 20, wherein if there is a minor difference, then prefer the comparison result vector which is better in terms of the minor difference.

22. The method of claim 18, wherein the major differences include at least one of:
registering objects for inspection, when registration is a prerequisite; a number of correctly inspected objects; a number of examples of a particularly undesirable failure mode; a number of extra big things; and a number of missing big things.

23. The method of claim 18, wherein the medium differences include at least one of:
a number of extra medium things; and a number of missing medium things.

24. The method of claim 18, wherein the small differences include at least one of:
a number of extra small things; a number of missing small things; and aggregate geometric discrepancies.

25. The method of claim 17, wherein the result comparison heuristic method includes:
comparing aspects of the comparison result vectors in order of decreasing importance.

26. The method of claim 1, wherein running the machine vision tool on said image using the combination of machine vision tool parameters includes:
running the machine vision tool on a plurality of images.

27. The method of claim 1, wherein comparing the desired image result with the corresponding computed image result so as to provide a comparison result vector that characterizes differences between the desired image result and the computed image result includes:
comparing boundaries in the desired image result with any corresponding boundaries in a corresponding computed image result.

28. The method of claim 27, wherein comparing boundaries in the desired image result with any corresponding boundaries in a corresponding computed image result includes:
making a first boundary list from the desired image result, and a second boundary list from the corresponding computed image result;
determining a closest pair of boundaries, one boundary from each of the first boundary list and the second boundary list;
determining whether the closest pair of boundaries is closer than a threshold distance measure; and
if the closest pair of boundaries is closer than the threshold distance measure, then add the closest pair of boundaries to a matched list.

29. The method of claim 28, further including:
if the closest pair of boundaries is not closer than the threshold distance measure, then add the closest pair of boundaries to a not-found list.

30. The method of claim 29, further including:
removing from consideration the closest pair of boundaries that is not closer than the threshold distance measure before again determining a closest pair of boundaries, one boundary from each of the first boundary list and the second boundary list.

31. The method of claim 30, further including:
if removing from consideration the closest pair of boundaries that is not closer than the threshold distance measure results in either an empty first boundary list, or an empty second boundary list, then include any boundary list of the first boundary list and the second boundary list that is not empty in the not-found list.

32. The method of claim 1, wherein comparing the desired image result with the corresponding computed image result so as to provide a comparison result vector that characterizes differences between the desired image result and the computed image result includes:
   comparing bounding boxes in the desired image result with any corresponding bounding boxes in a corresponding computed image result.

33. The method of claim 32, wherein comparing bounding boxes in the desired image result with any corresponding bounding boxes in a corresponding computed image result includes:
   making a first bounding box list from the desired image result, and a second bounding box list from the corresponding computed image result;
   determining a closest pair of bounding boxes, one bounding box from each of the first bounding box list and the second bounding box list;
   determining whether the closest pair of bounding boxes is closer than a threshold distance measure; and
   if the closest pair of bounding boxes is closer than the threshold distance measure, then add the closest pair of bounding boxes to a matched list.

34. The method of claim 33, further including:
   if the closest pair of bounding boxes is not closer than the threshold distance measure; then add the closest pair of bounding boxes to a not found list.

35. The method of claim 34, further including:
   removing from consideration the closest pair of bounding boxes that is not closer than the threshold distance measure before again determining a closest pair of bounding boxes, one bounding box from each of the first bounding box list and the second bounding box list.

36. The method of claim 35, further including:
   if removing from consideration the closest pair of bounding boxes that is not closer than the threshold distance measure results in either an empty first bounding box list, or an empty second bounding box list, then include any bounding box list of the first bounding box list and the second bounding box list that is not empty in the not-found list.

37. The method of claim 1, wherein one or more of the plurality of measures includes any of:
   a location of an object in each image;
   an extent of an object in each image; and
   a rotational measure of an object in each image.

38. A method for automatically determining machine vision tool parameters, the method comprising:
   providing at least one image, and providing a desired image result for each image of the at least one image, each desired image result including at least a desired measure of an object in each of the at least one image;
   selecting a combination of machine vision tool parameters;
   running, using a computer, the machine vision tool on the at least one image using the combination of machine vision tool parameters so as to provide a computed image result for each image of the at least one image, each computed image result including a plurality of computed measures;
   comparing, using a computer, each desired image result with a corresponding computed image result so as to provide a comparison result vector associated with the combination of machine vision tool parameters;
   comparing, using a computer, the comparison result vector associated with the combination of machine vision tool parameters to a previously computed comparison result vector associated with a previous combination of machine vision tool parameters; and
   determining, using a computer, which combination of machine vision tool parameters is better, thereby providing an incumbent best combination of vision tool parameters;
   wherein comparing each desired image result with a corresponding computed image result so as to provide a comparison result vector associated with the combination of machine vision tool parameters includes one or more of:
   incorporating as an aspect of the comparison result vector a number of correct match images, wherein the number of correct match images is the number of images where the computed image results induced by the combination of vision tool parameters each match the corresponding desired image results to within a match threshold;
   incorporating as an aspect of the comparison result vector a number of missing result images, wherein the number of missing result images is the number of images where some of the computed image results induced by the combination of vision tool parameters do not match the desired image results to within a match threshold;
   incorporating as an aspect of the comparison result vector a number of extra result images, wherein the number of extra result images is the number of images where the number of computed image results induced by the combination of vision tool parameters exceeds the number of desired image results;
   incorporating as an aspect of the comparison result vector a number of correct match instances, wherein the number of correct match instances is the number of instances where a computed image result induced by the combination of vision tool parameters matches a corresponding desired image result to within a match threshold;
   incorporating as an aspect of the comparison result vector a number of missing result instances, wherein the number of missing result instances is the number of instances where there is not a computed image result induced by the combination of vision tool parameters that matches a corresponding desired image result to within a match threshold;
   incorporating as an aspect of the comparison result vector a number of extra result instances, wherein the number of extra result instances is the number of instances of computed image results induced by the combination of vision tool parameters that do not correspond to any desired image results;
   incorporating as an aspect of the comparison result vector a total area of missing result instances, wherein the total area of missing result instances is the total area of instances where there is not a computed image result induced by the combination of vision tool parameters that matches a corresponding desired image result to within a match threshold;
   incorporating as an aspect of the comparison result vector a maximum area of missing result instances, wherein the maximum area of missing result instances is the maximum area among all instances where there is not a computed image result induced by the combination of vision tool parameters that matches a corresponding desired image results to within a match threshold;
   incorporating as an aspect of the comparison result vector a total area of extra result instances, wherein the total area of extra result instances is the total area of instances of computed image results induced by the combination of vision tool parameters that do not correspond to any desired image results;

incorporating as an aspect of the comparison result vector a maximum area of extra result instances, wherein the maximum area of extra result instances is the maximum area among all instances of computed image results induced by the combination of vision tool parameters that do not correspond to any desired image results;

incorporating as an aspect of the comparison result vector a total area of correct match instances, wherein the total area of correct match instances is the total area of instances where a computed image result induced by the combination of vision tool parameters matches a corresponding desired image result to within a match threshold;

incorporating as an aspect of the comparison result vector a maximum area of correct match instances, wherein the maximum area of correct match instances is the maximum area among all instances where a computed image result induced by the combination of vision tool parameters matches a corresponding desired image result to within a match threshold;

incorporating as an aspect of the comparison result vector a number of correct registration images, wherein the number of correct registration images is the number of images where the computed image results induced by the combination of vision tool parameters all together match the corresponding desired image results to within a registration threshold; and incorporating as an aspect of the comparison result vector any derived quantity based on at least one of theses foregoing aspects.

39. A method for automatically determining machine vision tool parameters, the method comprising:
providing at least one image, and a desired image result for each image of the at least one image, the desired image result including at least a desired measure of an object in each of the at least one image;
selecting a combination of machine vision tool parameters;
running, using a computer, the machine vision tool on the at least one image using the combination of machine vision tool parameters so as to output at least one computed image result for each image of the at least one image, the computed image result including a plurality of computed measures;
comparing, using a computer, each desired image result with a corresponding computed image result so as to provide a comparison result vector associated with the combination of machine vision tool parameters;
incorporating as an aspect of the comparison result vector a number of correct match images, wherein the number of correct match images is the number of images where the computed image results induced by the combination of vision tool parameters each match the corresponding desired image results to within a match threshold; and
using the comparison result vector, having a computer automatically determine an optimal set of machine vision tool parameters.

40. The method of claim 39, wherein one or more of the plurality of computed measures includes any of:
a location of an object in the at least one image;
an extent of an object in the at least one image; and
a rotational measure of an object in the at least one image.

41. A method for automatically determining machine vision tool parameters, the method comprising:
providing a plurality of images, and providing a desired image result for each image of the plurality of images, each desired image result including at least a desired measure of an object in each of the plurality of images;
selecting a combination of machine vision tool parameters;
running, using a computer, the machine vision tool on the plurality of images using the combination of machine vision tool parameters so as to provide a computed image result for each image of the plurality of images, each computed image result including a plurality of computed measures;
comparing, using a computer, each desired image result with a corresponding computed image result using a computer, so as to provide a comparison result vector associated with the combination of machine vision tool parameters, the comparison result vector based on differences between a plurality of measures in the desired image result and the computed image result, wherein one or more of the plurality of measures includes any of:
a location of an object in the plurality of images;
an extent of an object in each of the plurality of images; and
a rotational measure of an object in each of the plurality of images;
incorporating as an aspect of the comparison result vector a total area of correct match instances, wherein the total area of correct match instances is the total area of instances where a computed image result induced by the combination of vision tool parameters matches a corresponding desired image result to within a match threshold;
comparing, using a computer, the comparison result vector associated with the combination of machine vision tool parameters to a previously computed comparison result vector associated with a previous combination of machine vision tool parameters to determine which combination of machine vision tool parameters is better, thereby providing an incumbent best combination of vision tool parameters;
saving the incumbent best combination of machine vision tool parameters; and
providing the incumbent best combination of machine vision tool parameters as a best overall machine vision tool parameter combination, if there are no more parameter combinations to evaluate.

42. The method of claim 41, wherein comparing the comparison result vector associated with the combination of machine vision tool parameters to a previously computed comparison result vector associated with a previous combination of machine vision tool parameters includes:
comparing the comparison result vector to a previously computed comparison result vector using a result comparison heuristic method.

43. A method for automatically determining machine vision tool parameters, the method comprising:
providing at least one image, and providing a desired image result for each image of the at least one image, each desired image result including at least a desired measure of an object in each of the at least one image;
selecting a combination of machine vision tool parameters;
running, using a computer, the machine vision tool on the at least one image using the combination of machine vision tool parameters so as to provide a computed image result for each image of the at least one image, each computed image result including a plurality of computed measures;

comparing, using a computer, each desired image result with a corresponding computed image result so as to provide a comparison result vector associated with the combination of machine vision tool parameters;

comparing, using a computer, the comparison result vector associated with the combination of machine vision tool parameters to a previously computed comparison result vector associated with a previous combination of machine vision tool parameters;

determining, using a computer, which combination of machine vision tool parameters is better, thereby providing an incumbent best combination of vision tool parameters;

wherein the step of comparing the comparison result vector associated with the combination of machine vision tool parameters to a previously computed comparison result vector associated with a previous combination of machine vision tool parameters includes:

comparing the comparison result vector to a previously computed comparison result vector using a result comparison heuristic method; and wherein the result comparison heuristic method includes looking at major differences first, then medium differences, and then minor differences.

44. The method of claim 43, wherein if there is a major difference, then prefer the comparison result vector which is better in terms of the major difference, else if there are no major differences, then look at the medium differences.

45. The method of claim 43, wherein if there is a medium difference, then prefer the comparison result vector which is better in terms of the medium difference, else if there are no medium differences, then look at the minor differences.

46. The method of claim 45, wherein if there is a minor difference, then prefer the comparison result vector which is better in terms of the minor difference.

47. The method of claim 43, wherein the major differences include at least one of:

registering objects for inspection, when registration is a prerequisite; a number of correctly inspected objects; a number of examples of a particularly undesirable failure mode; a number of extra big things; and a number of missing big things.

48. The method of claim 43, wherein the medium differences include at least one of:

a number of extra medium things; and a number of missing medium things.

49. The method of claim 43, wherein the small differences include at least one of:

a number of extra small things; a number of missing small things; and aggregate geometric discrepancies.

50. A method for automatically determining machine vision tool parameters, the method comprising:

providing at least one image, and providing a desired image result for each image of the at least one image, each desired image result including at least a desired measure of an object in each of the at least one image;

selecting a combination of machine vision tool parameters;

running, using a computer, the machine vision tool on the at least one image using the combination of machine vision tool parameters so as to provide a computed image result for each image of the at least one image, each computed image result including a plurality of computed measures;

comparing, using a computer, each desired image result with a corresponding computed image result so as to provide a comparison result vector associated with the combination of machine vision tool parameters;

comparing, using a computer, the comparison result vector associated with the combination of machine vision tool parameters to a previously computed comparison result vector associated with a previous combination of machine vision tool parameters;

determining, using a computer, which combination of machine vision tool parameters is better, thereby providing an incumbent best combination of vision tool parameters;

wherein the step of comparing the comparison result vector associated with the combination of machine vision tool parameters to a previously computed comparison result vector associated with a previous combination of machine vision tool parameters includes comparing the comparison result vector to a previously computed comparison result vector using a result comparison heuristic method; and wherein the result comparison heuristic method includes comparing aspects of the comparison result vectors in order of decreasing importance.

51. A method for automatically determining machine vision tool parameters, the method comprising:

providing at least one image, and providing a desired image result for each image of the at least one image, each desired image result including at least a desired measure of an object in each of the at least one image;

selecting a combination of machine vision tool parameters;

running, using a computer, the machine vision tool on the at least one image using the combination of machine vision tool parameters so as to provide a computed image result for each image of the at least one image, each computed image result including a plurality of computed measures;

comparing, using a computer, each desired image result with a corresponding computed image result so as to provide a comparison result vector associated with the combination of machine vision tool parameters;

comparing, using a computer, the comparison result vector associated with the combination of machine vision tool parameters to a previously computed comparison result vector associated with a previous combination of machine vision tool parameters;

determining, using a computer, which combination of machine vision tool parameters is better, thereby providing an incumbent best combination of vision tool parameters;

wherein the step of providing a desired image result for each image of the at least one image includes enabling a user to mark the at least one image so as to provide a marked image, each marked image having marking that indicates a location and an extent of each object in the image; and extracting the marking so as to provide the desired image result, and at least a desired measure of the at least one object in the image; and wherein the marking is a bounding box.

52. The method of claim 51, wherein the bounding box is an axis-aligned bounding box, and is specified by four measures.

53. The method of claim 52, wherein the four measures are: upper left-hand X, upper left-hand Y, lower right-hand X, lower right-hand Y.

54. The method of claim 51, wherein the bounding box is a rotated bounding box, and is specified by five measures.

55. The method of claim 54, wherein the five measures are: upper left-hand X, upper left hand Y, lower right hand X, lower right hand Y, and a rotational measure that represents a rotation of the bounding box about an upper left hand corner of the bounding box.

56. The method of claim 54, wherein the bounding box is a minimum enclosing rectangle.

57. A method for automatically determining machine vision tool parameters, the method comprising:
   providing at least one image, and providing a desired image result for each image of the at least one image, each desired image result including at least a desired measure of an object in each of the at least one image;
   selecting a combination of machine vision tool parameters;
   running, using a computer, the machine vision tool on the at least one image using the combination of machine vision tool parameters so as to provide a computed image result for each image of the at least one image, each computed image result including a plurality of computed measures;
   comparing, using a computer, each desired image result with a corresponding computed image result so as to provide a comparison result vector associated with the combination of machine vision tool parameters;
   comparing, using a computer, the comparison result vector associated with the combination of machine vision tool parameters to a previously computed comparison result vector associated with a previous combination of machine vision tool parameters;
   determining, using a computer, which combination of machine vision tool parameters is better, thereby providing an incumbent best combination of vision tool parameters; and
   wherein the desired measure of an object in each of the at least one image includes a pose of a feature in the at least one image.

58. The method of claim 57, wherein the pose is characterized by six measures.

59. A method for automatically determining machine vision tool parameters, the method comprising:
   providing at least one image, and providing a desired image result for each image of the at least one image, each desired image result including at least a desired measure of an object in each of the at least one image;
   selecting a combination of machine vision tool parameters;
   running, using a computer, the machine vision tool on the at least one image using the combination of machine vision tool parameters so as to provide a computed image result for each image of the at least one image, each computed image result including a plurality of computed measures;
   comparing, using a computer, each desired image result with a corresponding computed image result so as to provide a comparison result vector associated with the combination of machine vision tool parameters,
   comparing, using a computer, the comparison result vector associated with the combination of machine vision tool parameters to a previously computed comparison result vector associated with a previous combination of machine vision tool parameters;
   determining, using a computer, which combination of machine vision tool parameters is better, thereby providing an incumbent best combination of vision tool parameters; and
   wherein the step of comparing each desired image result with a corresponding computed image result so as to provide a comparison result vector associated with the combination of machine vision tool parameters includes:
   comparing boundaries in the desired image result with any corresponding boundaries in a corresponding computed image result; and
   wherein the step of comparing boundaries in the desired image result with any corresponding boundaries in a corresponding computed image result includes:
     making a first boundary list from the desired image result, and a second boundary list from the corresponding computed image result;
     determining a closest pair of boundaries, one boundary from each of the first boundary list and the second boundary list;
     determining whether the closest pair of boundaries is closer than a threshold distance measure; and
     if the closest pair of boundaries is closer than the threshold distance measure, then adding the closest pair of boundaries to a matched list.

60. The method of claim 59, further including:
   if the closest pair of boundaries is not closer than the threshold distance measure, then add the closest pair of boundaries to a not-found list.

61. The method of claim 60, further including:
   removing from consideration the closest pair of boundaries that is not closer than the threshold distance measure before again determining a closest pair of boundaries, one boundary from each of the first boundary list and the second boundary list.

62. The method of claim 61, further including:
   if removing from consideration the closest pair of boundaries that is not closer than the threshold distance measure results in either an empty first boundary list, or an empty second boundary list, then include any boundary list of the first boundary list and the second boundary list that is not empty in, the not-found list.

63. A method for automatically determining machine vision tool parameters, the method comprising:
   providing at least one image, and providing a desired image result for each image of the at least one image, each desired image result including at least a desired measure of an object in each of the at least one image;
   selecting a combination of machine vision tool parameters;
   running, using a computer, the machine vision tool on the at least one image using the combination of machine vision tool parameters so as to provide a computed image result for each image of the at least one image, each computed image result including a plurality of computed measures;
   comparing, using a computer, each desired image result with a corresponding computed image result so as to provide a comparison result vector associated with the combination of machine vision tool parameters;
   comparing, using a computer, the comparison result vector associated with the combination of machine vision tool parameters to a previously computed comparison result vector associated with a previous combination of machine vision tool parameters;
   determining, using a computer, which combination of machine vision tool parameters is better, thereby providing an incumbent best combination of vision tool parameters; and
   wherein comparing each desired image result with a corresponding computed image result so as to provide a comparison result vector associated with the combination of machine vision tool parameters includes:
   comparing bounding boxes in the desired image result with any corresponding bounding boxes in a corresponding computed image result.

64. The method of claim 63, wherein comparing bounding boxes in the desired image result with any corresponding bounding boxes in a corresponding computed image result includes:
- making a first bounding box list from the desired image result, and a second bounding box list from the corresponding computed image result;
- determining a closest pair of bounding boxes, one bounding box from each of the first bounding box list and the second bounding box list;
- determining whether the closest pair of bounding boxes is closer than a threshold distance measure; and
- if the closest pair of bounding boxes is closer than the threshold distance measure, then adding the closest pair of bounding boxes to a matched list.

65. The method of claim 64, further including:
- if the closest pair of bounding boxes is not closer than the threshold distance measure; then add the closest pair of bounding boxes to a not found list.

66. The method of claim 65, further including:
- removing from consideration the closest pair of bounding boxes that is not closer than the threshold distance measure before again determining a closest pair of bounding boxes, one bounding box from each of the first bounding box list and the second bounding box list.

67. The method of claim 66, further including:
- if removing from consideration the closest pair of bounding boxes that is not closer than the threshold distance measure results in either an empty first bounding box list, or an empty second bounding box list, then include any bounding box list of the first bounding box list and the second bounding box list that is not empty in the not-found list.

68. A method for automatically determining machine vision tool parameters, the method comprising:
- providing an image, and a desired image result for the image, the desired image result including one or more markings made by a user to indicate a desired measure of each of one or more objects to be located and/or inspected in the image;
- selecting a combination of machine vision tool parameters;
- running, using a computer, a machine vision tool on said image using the combination of machine vision tool parameters so as to output a computed image result for that includes a computed measure of each of one or more objects in the image; and
- with a computer, using the computed image result and the desired image result to automatically determine an optimal set of said machine vision tool parameters.

69. A method for automatically determining machine vision tool parameters, the method comprising:
- providing an image, and providing a desired image result the image, the desired image result including one or more markings made by a user to indicate a desired measure of each of one or more objects to be located and/or inspected in the image;
- selecting a combination of machine vision tool parameters;
- running, using a computer, a machine vision tool on said image using the combination of machine vision tool parameters so as to provide a computed image result that includes a computed measure of each of one or more objects in the image;
- comparing, using a computer, the desired image result with the corresponding computed image result, so as to provide a comparison result vector that characterizes differences between the desired measure of each of one or more objects in the image and the computed measure of each of one or more objects in the image, wherein the desired and computed measures of objects in the image include any of:
  - a location of an object in the image;
  - an extent of an object in each of the image; and
  - a rotational measure of an object in the image;
- comparing, using a computer, the comparison result vector to that associated with a previous combination of machine vision tool parameters to determine a combination of machine vision tool parameters that is better with respect to the differences between the desired image result and the computed image result when the machine vision tool is run on an image of a type provided;
- saving an incumbent best combination of machine vision tool parameters; and
- providing the incumbent best combination of machine vision tool parameters as a best overall machine vision tool parameter combination, if there are no more parameter combinations to evaluate.

* * * * *